US011648839B2

(12) United States Patent
Cates (10) Patent No.: US 11,648,839 B2
(45) Date of Patent: May 16, 2023

(54) MOTORIZED FOLDABLE BEACH OR RECREATION CART (71) Applicant: Delta Interior Construction, Inc., North Arlington, NJ (US)

(72) Inventor: Robert Cates, North Arlington, NJ (US)

(*) Notice: Subject to any disclaimer, the term of this patent is extended or adjusted under 35 U.S.C. 154(b) by 12 days.

(21) Appl. No.: 16/812,239

(22) Filed: Mar. 6, 2020

(65) Prior Publication Data
US 2020/0207214 A1    Jul. 2, 2020

Related U.S. Application Data (63) Continuation of application No. 14/286,963, filed on May 23, 2014, now Pat. No. 10,717,360.

(51) Int. Cl.
*B62B 3/02*   (2006.01)
*B62B 5/00*   (2006.01)
*B62B 3/00*   (2006.01)
*B60L 50/60*  (2019.01)
*B60L 8/00*   (2006.01)
*B62B 13/18*  (2006.01)

(52) U.S. Cl.
CPC .............. *B60L 8/003* (2013.01); *B60L 50/66* (2019.02); *B62B 3/008* (2013.01); *B62B 3/02* (2013.01); *B62B 5/0033* (2013.01); *B62B 13/18* (2013.01); *B60L 2200/22* (2013.01); *B60L 2200/40* (2013.01); *B62B 2202/401* (2013.01); *B62B 2202/402* (2013.01); *B62B 2202/404* (2013.01); *B62B 2202/52* (2013.01); *B62B 2206/006* (2013.01); *B62B 2301/254* (2013.01); *B62B 2301/256* (2013.01); *Y02T 10/64* (2013.01); *Y02T 10/70* (2013.01); *Y02T 10/7072* (2013.01)

(58) Field of Classification Search
CPC ...... B60L 8/003; B60L 50/66; B60L 2200/40; B60L 2200/22; B62B 3/02; B62B 3/008; B62B 5/0033; B62B 13/18; B62B 2202/402; B62B 2202/52; B62B 2202/401; B62B 2202/404; B62B 2206/006; B62B 2301/254; B62B 2301/256; Y02T 10/64; Y02T 10/70; Y02T 10/7072
USPC ....................................... 180/9.22
See application file for complete search history.

(56) References Cited

U.S. PATENT DOCUMENTS

| 6,502,656 B2 * | 1/2003 | Weiss ............... B62B 5/0026 280/30 |
| 7,818,840 B2 * | 10/2010 | Barnett .............. A61G 1/017 280/647 |
| 2012/0160577 A1 * | 6/2012 | Anasiewicz ........ B62D 51/04 180/19.1 |

OTHER PUBLICATIONS

Office Action in U.S. Appl. No. 14/286,963, dated Jun. 13, 2019.

* cited by examiner

*Primary Examiner* — Kevin Hurley
*Assistant Examiner* — Felicia L. Brittman
(74) *Attorney, Agent, or Firm* — Joseph P. Aiena (57) ABSTRACT

There is provided a foldable motorized cart having at least a first and a second connected section, each of the sections connected with a hinge and pivotable with respect to each other and further including a compartment hingedly connected to either one of the sections, with the compartment having a bottom floor, side walls and a top cover surface, and also having an internal space for containing, a motor drive system, a drive controller and a battery. The battery and drive controller are electrically connected to the motor drive system which is mechanically linked to at least one of a drive wheel or a drive track mechanism for propelling the (Continued)

motorized cart, where the motor drive system is located within the drive track mechanism.

1 Claim, 8 Drawing Sheets

MOTORIZED FOLDABLE BEACH OR RECREATION CART

CROSS REFERENCE TO RELATED APPLICATIONS

This application is a continuation of and claims priority to and benefit of U.S. non-provisional patent application Ser. No. 14/286,963, filed on May 23, 2014 and incorporated herein by reference in its entirety.

BACKGROUND OF THE INVENTION

1. Field of the Invention

The present invention relates generally to carts for transportation of outdoor recreation equipment for use in outdoor recreation such as on the beach, camping or snow sports or other outdoor and cold weather sports such as skating and or ice fishing, and more particularly, to a motorized cart for such uses.

2. Description of the Related Art

Many beach-goers or other engaging in outdoor recreation such as skiing or watersports have homes or stay in hotels or beach houses near the beach or their chosen recreation venue or alternately drive to parking lots relatively near the beach, and then may have to make many trips to hand carry all of their beach supplies to the beach from their home or car. These supplies can include for example, chairs, umbrellas, and coolers. Thus, a beach cart for carrying such items is desirable to reduce the number of trips and to make it easier to transport heavy items. Such a cart, however, is typically transported in the car to and from the parking lot and thus must be of compact size so it can be easily packed in the car along with all the other items that are being transported for the day. In addition, pushing and/or pulling such a cart, particularly if heavily laden, can be inconvenient or impossible for some people who lack sufficient physical strength especially across the beach sand, snow and other surfaces. To ease the physical burden on the beach goers, a motorized cart is desirable, for example especially when a family is engaged in snow sports such as skiing and snow-boarding, many times the younger family members can not carry all of their equipment such as skis, snowboards, helmets, boots and extra clothing from the car parking area or ski lodge to the base of the mountain. Therefore, many trips to transport all the equipment will be required or some members of the group may be overburdened carrying equipment for themselves, plus other members of the group. Many examples of motorized carts are known, particularly with respect to motorized golf carts for carrying golf bags and clubs. But these carts lack features that are focused on the needs of beach cart users, are not always sufficiently compact for transportation to the beach and may be difficult to load with all of the beach provisions.

What is needed is a battery powered motorized beach cart that may be folded into a compact configuration for storage and transportation and provides a plurality of storage compartments, which may include lockable compartments, and insulated compartments, adapted to carry different items, and provides auxiliary features such as a solar panel for charging the drive motor batteries as well as powering personal devices such as personal portable electronic devices and provides a motorized drive system that is low weight, sturdy, efficient and adaptable for traversing sand, asphalt, snow, grass and boardwalk surfaces including ramps and stairs and has a collapsible storage container and a collapsible frame for easy storage and transportation of the cart. Additionally, the cart should be stable, rugged, and adaptable to multiple transportation situations, including traversing sand, snow and stairs.

SUMMARY OF THE INVENTION

The present invention provides a motorized beach cart for easily traversing different surfaces and which may be utilized for carrying beach provisions, recreation equipment and other outdoor provisions and supplies, providing storage compartments adapted to carrying particular items and provides auxiliary features and may be folded into a compact configuration for easy storage and transportation.

An object of the present invention is to substantially solve at least some of the above problems and/or disadvantages and to provide at least some of the advantages below. Accordingly, an object of the present invention is to provide a foldable motorized cart, comprising a front portion, a middle portion having a front end and a rear end and a rear portion, wherein the middle portion, is hingedly attached to the front portion at the front end and hingedly attached to the rear portion at the rear end, wherein each of the front portion, and the middle portion have a low friction bottom floor and at least two side walls and an open top and wherein the rear portion has a bottom floor, four side walls and a top surface, and is foldable within the sidewalls of the middle portion and the front portion is foldable over the middle portion, a compartment within the rear portion having at least one storage space and a systems housing space, a motor drive system, a drive controller and a battery, wherein the battery and drive controller are electrically connected to the motor drive system and the motor drive system is mechanically linked to a drive track for propelling the motorized cart.

Another object of the present invention is to provide a motorized cart where the motor drive system is a tubular motor located within the drive track.

Another object of the present invention is to provide a motorized cart where the motor drive system is located within the system housing space.

Another object of the present invention is to provide a motorized cart where the rear portion top surface is hingedly rotatable from a closed to an open position.

Another object of the present invention is to provide a motorized cart where the drive controller is electrically connected to a control input device.

BRIEF DESCRIPTION OF THE DRAWINGS

The above and other objects, features and advantages of the present invention will become more apparent from the following detailed description when taken in conjunction with the accompanying drawings in which:

FIG. 2A-2E are a rear perspective, front perspective, side perspective, side view and top plan view respectively of the motorized cart according to the present invention wherein:

FIG. 2A is a rear perspective view of the motorized cart according to the present invention, FIG. 2B is a front perspective view of ONLY the rear storage compartment portion of the motorized cart according to the present invention, FIG. 2C is a side perspective view of the motorized cart according to the present invention, FIG. 2D is a side view of the motorized cart according to the present invention and, FIG. 2E depicts a top plan view of the motorized cart according to the present invention.

DETAILED DESCRIPTION OF THE PREFERRED EMBODIMENTS

Exemplary embodiments of the present invention will be described herein below with reference to the accompanying drawings to assist in a comprehensive understanding of exemplary embodiments of the invention as defined by the claims and their equivalents. In the following description, well-known functions or constructions are not described in detail since they would obscure the understanding of the subject matter of the present invention in unnecessary detail by a person of ordinary skill in the art with unnecessary detail of the well-known functions and structures.

Preferred embodiments of the present invention will be described herein below with reference to the accompanying drawings. In the following description, detailed descriptions of well-known functions or constructions will be omitted since they would obscure the invention in unnecessary detail. Also, the terms used herein are defined according to the functions of the present invention. Thus, the terms may vary depending on user's or operator's intentions or practices. Therefore, the terms used herein must be understood based on the descriptions made herein.

Therefore, the terms used herein should be understood based on the descriptions made herein in view of the ordinary level of skill in the art. The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Figure 1:
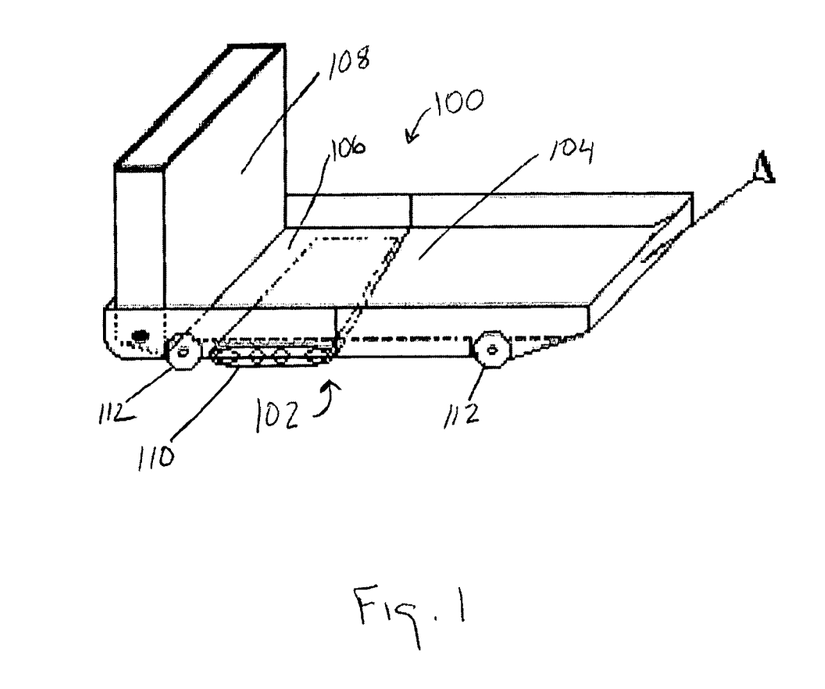
FIG. 1 is a perspective view of the motorized cart according to the present invention.
Figure 7A:
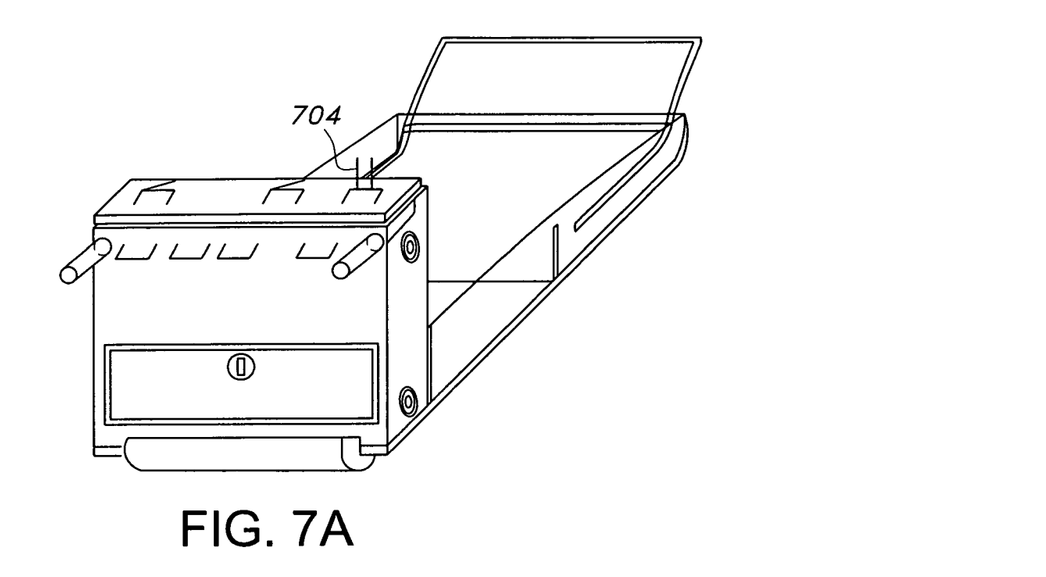
FIG. 7A is a rear perspective view of the rear storage compartment portion and the middle and front portion of the motorized cart according to an embodiment of the present invention.
Figure 7B:
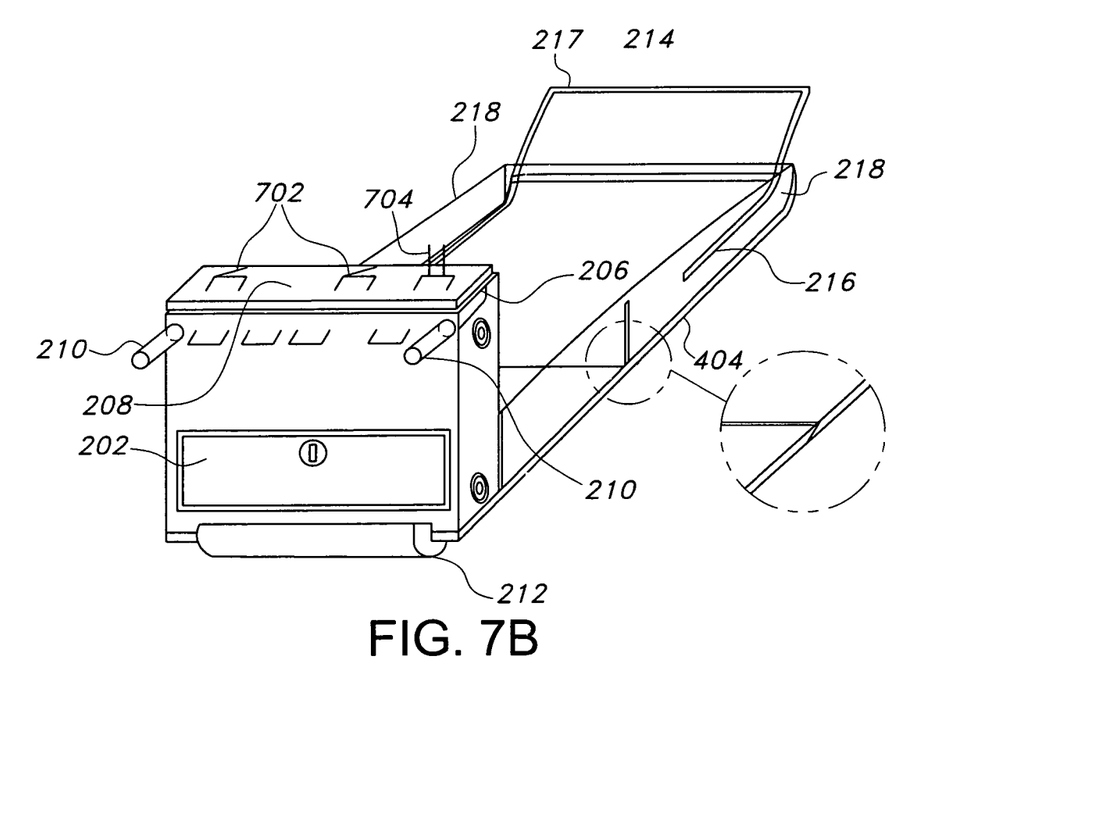
FIG. 7B is a rear perspective view of the middle and front portion of the motorized cart according to an embodiment of the present invention.
Figure 7C:
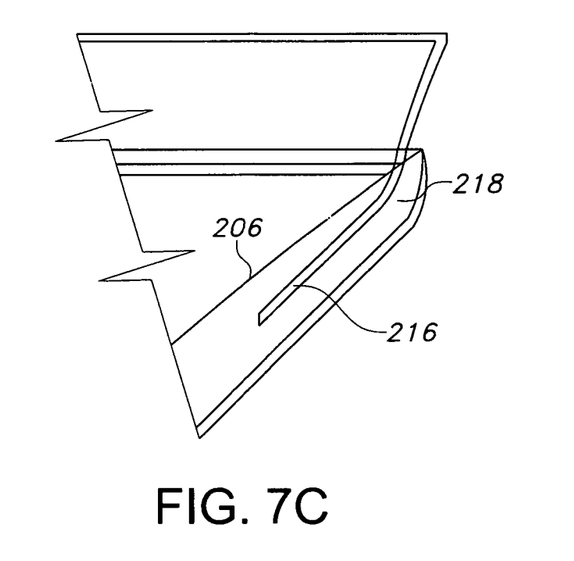
FIG. 7C is a side perspective view of the middle and front portion of the motorized cart according to an embodiment of the present invention.
Figure 7D:
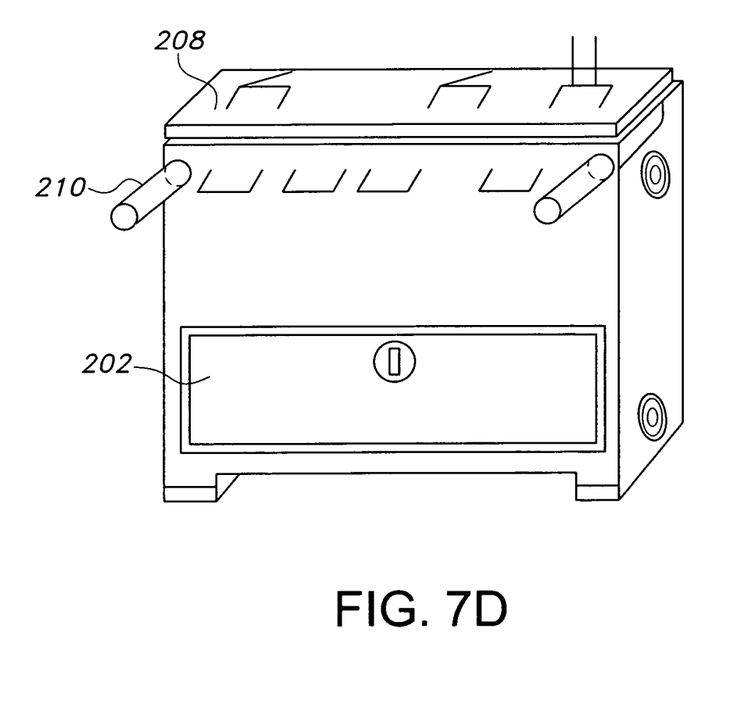
FIG. 7D is a rear perspective view of the rear storage compartment portion of the motorized cart according to an embodiment of the present invention.

Turning now to FIG. 1, there is provided a perspective view of the motorized cart according to the present invention. The motorized cart 100 includes a main body 102 which may be comprised, in this embodiment of three body portions. The body portions may include a front portion 104, a middle portion 106 and a rear portion 108. As will be further explained herein after, the front, middle and rear portion are hingedly connected such that the main body may be closed into a compact form by folding the front portion, the middle portion and the rear portion into a suitcase like configuration. In an alternate embodiment, each of the front, middle and rear portion may be detachably connected using screws, or bolts or other types of fasteners known in the art. Clamps and buckles and or latches may also be used. The motorized cart 100 further includes a motor for propulsion, (not visible in this view), a propulsion track 110, wheels 112 and a low friction bottom surface 404 (not visible in this view), such that the cart may be easily moved over surfaces such as snow, ice and grass, although uses of the cart are not limited thereto. In one embodiment, as shown in FIGS. 7 and 7A the low friction bottom surface 404 may extend over the entire bottom surface as depicted in FIGS. 7 and 7A and as may be seen in FIGS. 4C, 4D and 4E, and the propulsion track may be omitted. In such an embodiment the present invention may be particularly adapted for use on low friction surfaces such as snow and ice, where the user may not need motorized assistance to move the cart. In such an embodiment the total weight of the cart can thus be minimized by omitting the propulsion system or making the propulsion system a modular component than can easily be removed temporarily from the cart and replaced for alternate uses. In another alternate embodiment the propulsion track may be omitted and propulsion wheels 112 be substituted as shown in FIG. 1. In another alternate embodiment the propulsion track, roller 212 and wheels 112 may be omitted entirely. In such an embodiment, the user would primarily be using the cart on a low friction surface, such as ice or snow and such that a mechanical assist is not needed.

Figures 2A, 2B, 2C, 2D, 2E:
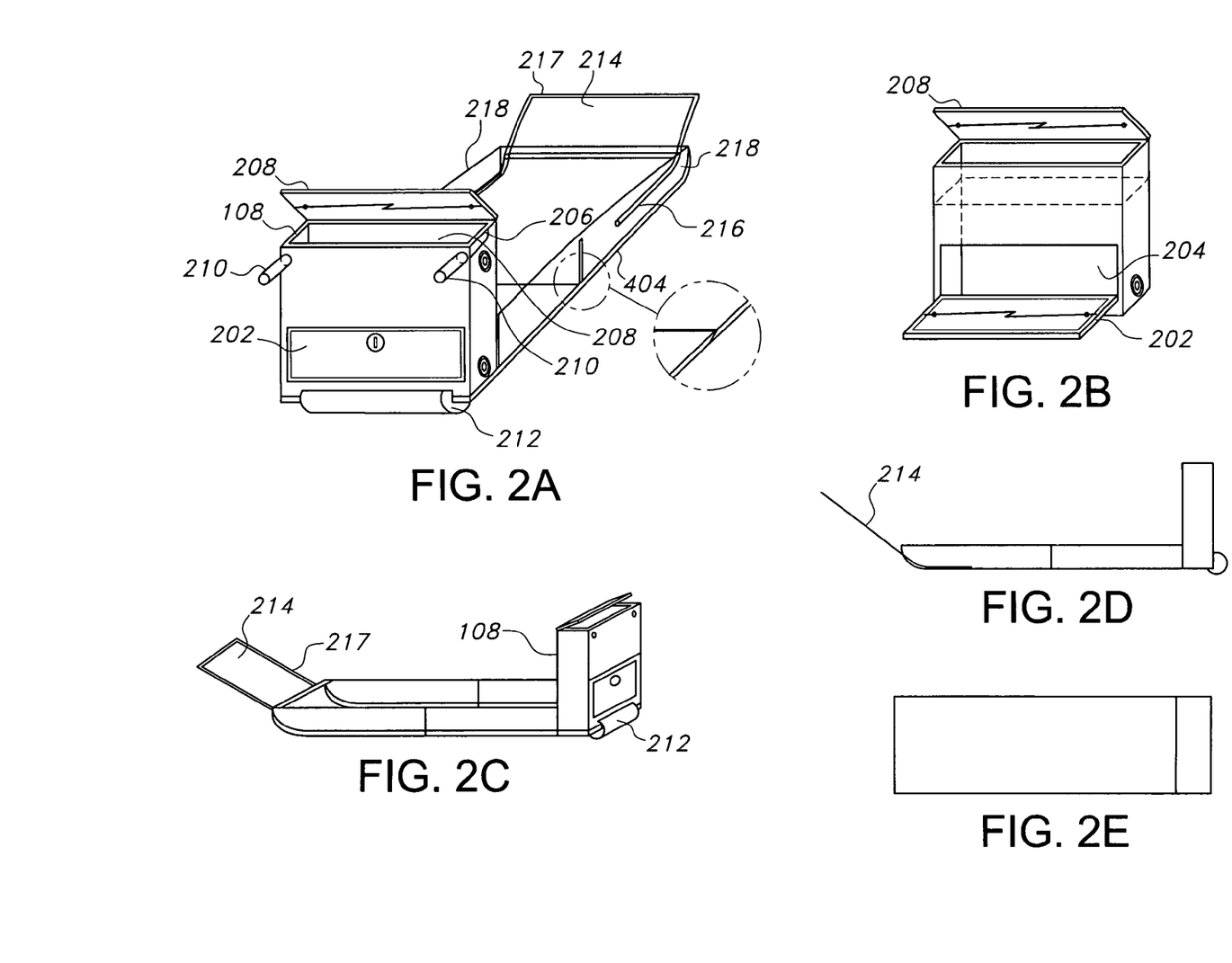

Turning now to FIGS. 2A-2E, there are shown various views of the motorized cart according to the present invention. In FIG. 2A there is shown a rear view of the motorized cart depicted in FIG. 1. Shown in this view is a rear view of the cart 100 in which rear portion 108 is visible. Additionally, there is shown a storage cabinet cover 202, which is closed in FIG. 2A, wherein it covers the storage cabinet 204. The storage cabinet is located within the articulating portion of the rear portion 108 and is adapted to carry small or fragile items that require the additional protection of being transported in a protected environment. In another embodiment, storage cabinet 204 may be an insulated container for transporting and storing perishable foods and drinks. In that embodiment, the storage container may be filled with ice up to a level just below the storage cabinet cover 202 or may alternately have ice placed in the top cabinet 206 to serve as a coolant for the storage cabinet 204. Top cabinet 206 is covered by a hinged lid 208 which may be pivoted between a closed and open position thereby providing access to top cabinet 206 so that items or ice may be placed therein. The rear portion 108 storage cabinet may also include an interior space for holding the different drive and control systems of the motorized cart. These may include the drive motor 221, the drive motor and accessory batteries 223 and 225, and an electrical connector 227 for connecting devices to the accessory battery, the control circuit and charging circuit. Typically, these items will be located in the bottom of the storage cabinet so that the weight balance and distribution is maintained in a manner which balances the cart and makes movement and maneuverability easy for the user. Additionally, the compartments may be adapted to segregate certain items. For example a lock can be provided on cover 202 and compartment 204 used for valuable items, while, as described later herein, compartment 206 may be sealed or insulated for holding wet items or for use as a cooler or insulated compartment. Of course, one skilled in the art will recognize that the position, orientation and location of the compartments may be altered to better suit a particular use while keeping within the spirit of the present invention.

Also shown in FIG. 2A there are also provided handles 210 which a user may grasp to direct the motorized cart. The handles can be used for steering the cart as they may include a control mechanism, such as a rotatable throttle as used on motorcycles where a user can rotate either the right or left handle to increase power of a motor on the respective side of the motorized cart 100 to impart increased thrust on one side of the cart and thus steer the cart to turn toward in a direction corresponding to the increased power. The rotatable throttles can also be used to increase the power of either the right side or left side drive motor and thus steer the cart by imparting greater drive thrust to one side. The throttles can also be rotated in such a way to reverse the motors and move the motorized cart in a backwards direction. Alternately, in another embodiment, the handles 210 may be simple weight bearing supports which may be retained within an aperture 209 in rear portion 108. The handles can then be inserted and removed by the user as required to move the cart. For example, the handles can be inserted for a user to lift the rear portion of the cart to move the cart up stairs or over an obstacle.

Figures 6A, 6D:
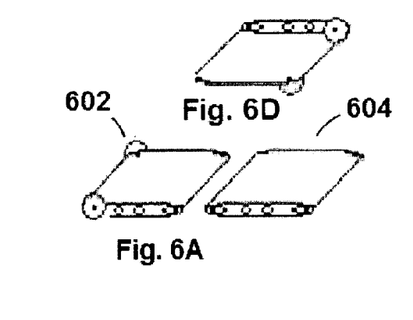
FIG. 6A depicts a right side top perspective view of the drive track system of the motorized cart according to the present invention separated from the cart.
FIG. 6D depicts a left side bottom perspective view of the drive track system of the motorized cart according to the present invention separated from the cart.

Also visible in FIGS. 2A and 2C is a roller 212 which may serve as a wheel for the rear portion 108 of the motorized cart and may also be engaged with one or more drive motors for imparting forward thrust to move the motorized cart. As will be apparent to one skilled in the art, drive wheels may be attached to the drive motor by a belt, chain or gear system for imparting power from the motor to the drive wheels. An appropriate linkage and or transmission may be provided for driving more than one wheel for adjusting the motor power output to the wheels. As will also be apparent to one skilled in the art, any combination of drive wheels and non-driven wheels may be implemented in the present invention along with the roller 212 or drive track 110 As will also be apparent to one skilled in the art, the various wheel combination and folding configurations allow the present invention to be configured as used as a hand truck such as shown in FIG. 6 or FIG. 1.

The motorized cart 100 may also include a fold out flap 214 which is hingedly connected to the front portion 102 and may fold out towards the front of the motorized cart 100 to extend the front of the cart 100 to increase storage and carrying space as well as to prevent debris from entering the cart 100. This is especially helpful to keep the inside of cart 100 from accumulating sand or snow or other residue when using the cart on such loose surfaces. The fold out flap may also be attached to the front portion 102 by a telescoping rod 216. The front flap may be thus extended to lengthen telescoping rod. Further, the front portion 102 and the middle portion 106 are formed having a bottom wall and side walls 218 which form a tray with an open top for storing and carrying items. Additionally, when folded, as will be shown and described with respect to FIGS. 4C-4E, the sidewalls form the sides of a carrying compartment in the form of a suitcase or carrying case. FIG. 2E depicts a top plan view of the motorized cart, showing a generally rectangular shape, although the motorized cart shape is not so limited and may be shaped in various alternate forms in keeping with the present invention. In another embodiment, telescoping rod 216 may form a loop handle which may be used to pull the cart from the front. In this embodiment, the telescoping rod 216 may be extended so that the handle is positioned at a height that is easy to grasp and use to pull the cart along the ground. In such an alternate embodiment, the loop handle 217 would be connected to telescoping rod 216 and extend beyond the front of the cart.

Figure 3A:
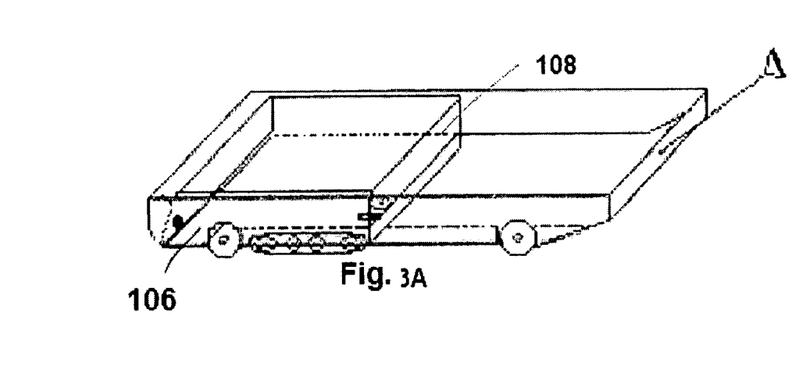
FIG. 3A is a side perspective view of the front and middle portion of the motorized cart according to the present invention where the storage compartment is lying horizontal within the middle portion.
Figure 3B:
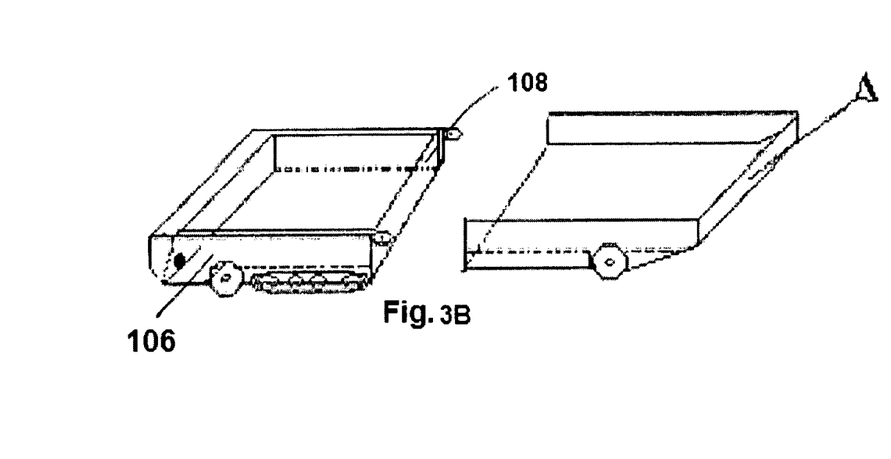
FIG. 3B is a side perspective view of the front and middle portion of the motorized cart according to the present invention where the storage compartment is lying horizontal within the middle portion and the front portion is disattached from the middle portion.

Turning now to FIG. 3A-B, there is shown a side perspective view of the motorized cart 100 in a partially folded configuration where rear portion 108 is folded within middle portion 106. In the view shown in FIG. 3B, the front portion 102 is depicted as detached from the middle portion 106 and may in another step be attached to the middle portion 106 to form a closed container. This may be accomplished using various attaching means such as hooks, snaps, hook and loop fabric, clasps and buckles. Alternately, where the front portion 102 is hingedly attached to the middle portion 106, the front portion may be folded over the rear and middle portion to form a closed container or case. As can be further seen in FIG. 3A-B, the motorized cart may also include a tow rope 302 and handle 304 for assisting in moving and steering the cart 100. The tow rope and handle may in one embodiment be a simple rope, cable or chain with a handle for gripping by a user where the user may impart additional power to pull the cart where the motor and drive tread runs at a constant speed, force, thereby only providing an assist to the user but not being the primary drive source. Alternately tow rope 302 and handle 304 may provide a motor control device such as a handle with push buttons or switches for controlling motor drive speed and power output, either through a direct analog circuit or through a digital control circuit as would be used by one skilled in the art of motor controls.

The handle in such an embodiment may include electronic controls as well and be connected to the motorized cart using a wire for an electrical connection. In another alternate embodiment, the handle may include a communications circuit such as a Blue tooth, IR or RF device for communicating through a Blue tooth, IR or RF communications circuit on the motorized cart and interfacing with a motor controller circuit. In this way a user can carry a remote control that wirelessly links to the motorized cart for controlling the movement and other features of the motorized cart as will be further explained herein.

Figure 4A:
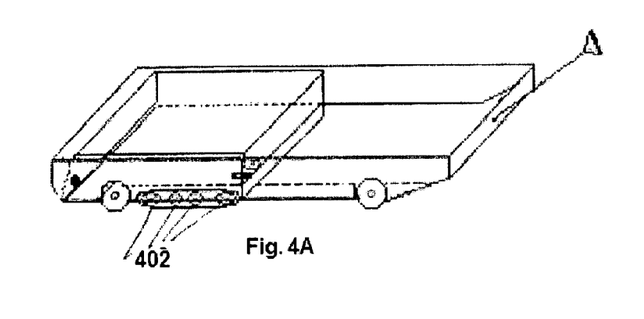
FIG. 4A is a side perspective view of the front and middle portion of the motorized cart according to the present invention where the storage compartment is lying horizontal within the middle portion.
Figure 4B:
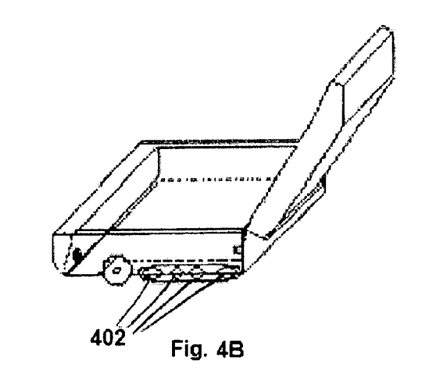
FIG. 4B is a side perspective view of the front and middle portion of the motorized cart according to the present invention in a partially folded configuration where the storage compartment is lying horizontal within the middle portion.
Figure 4C:
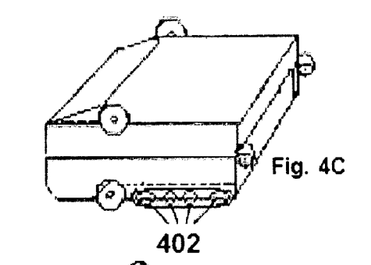
FIG. 4C is a side perspective view of the front and middle portion of the motorized cart according to the present invention in a horizontal folded configuration.
Figure 4D:
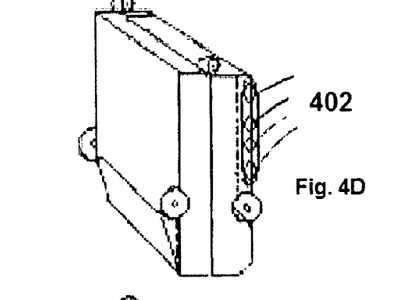
FIG. 4D is a side perspective view of the front and middle portion of the motorized cart according to the present invention in a vertical folded configuration.
Figure 4E:
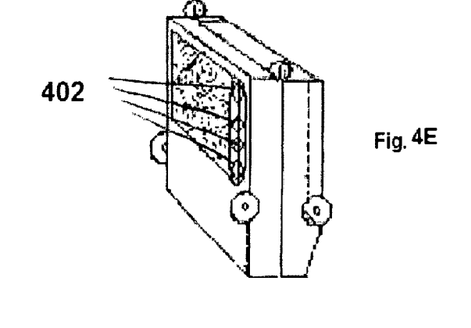
FIG. 4E is a side perspective view of the front and middle portion of the motorized cart according to the present invention in a vertical folded configuration displaying both the sides and bottom surfaces.

Turning now to FIG. 4A-E, there is shown a perspective view of the motorized cart 100 according to the present invention. In FIG. 4A the cart is shown with only the rear portion 108 fully folded into the middle portion 106, and the middle portion 106 and the front portion 102 being in a horizontal co-planar flat orientation. In FIG. 4B, the motorized cart is shown with the front portion 102 partially folded with respect to the middle 106 and the rear portions 108. In FIG. 4C, the motorized cart is shown in a completely folded configuration wherein the front portion 102 has been folded over the middle and rear portions and forms an enclosed case. When folded in this manner the rear portion is folded within the side walls of the middle portion and then the front portion may be folded over the rear portion which has already been folded within the middle portion, and bottom surface 404 is visible and in a horizontal orientation, but positioned at the top of the folded cart due to the folded configuration. In this configuration, the motorized cart can be easily stored or transported. In the view of FIG. 4D, the motorized cart has been up-righted to a vertical position from the horizontal position shown in FIG. 4C, with the bottom surface 404 of front portion 102 visible. In the view of FIG. 4E the vertically standing motorized cart 100 has been turned around such that now the bottom of rear portion 108 is visible. In this view, the drive or propulsion track 110 is visible on the bottom of rear portion 108. The drive track 110 is located on the bottom surface 404 of rear portion, such that it is in contact with the ground when the motorized cart is in the open horizontal position. In that position, when the track 110 is moved by the electric motors, the motorized cart can be pushed along surface of the ground but the force exerted by the track upon the ground surface.

Also visible in FIGS. 4A-4E are drive motors 402. In one embodiment, the drive motors 402 may be tubular motors, such as those typically used to power conveyor belt systems. The tubular motors may be installed and rigidly mounted under the motorized cart in such a way to provide power to the track as will be known by one skilled in the art. The drive track 110 may be one such as used on a snow mobile for example with a profile adapted to be used on both loose surfaces such as sand or more firm surfaces such as grass fields, concrete or asphalt. In addition, it is not necessary in accordance with the present invention to use tubular motors, but instead a motor or motors attached to a drive shaft and sprocket system such as those used in snowmobiles may be used to power the track 110. In another alternate embodiment, a motor or motors may be attached to a drive axle to power a wheel or wheels, such as wheels 112 may be utilized to eliminate the need for a drive track.

Figure 5A:
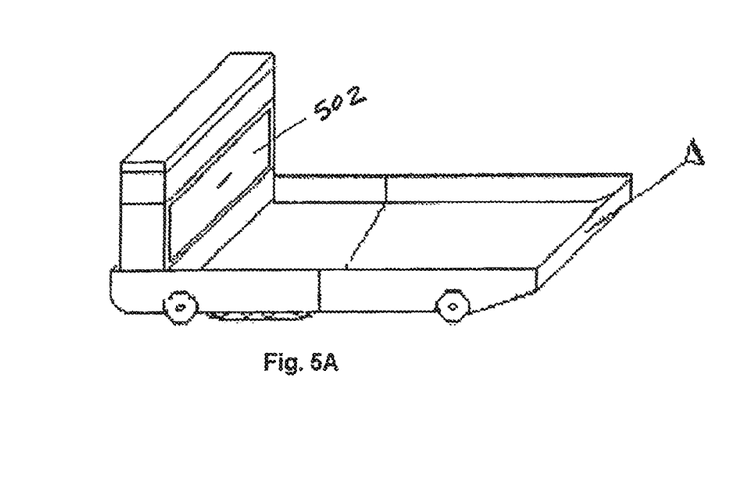
FIG. 5A is a side perspective view of the motorized cart according to the present invention.
Figure 5B:
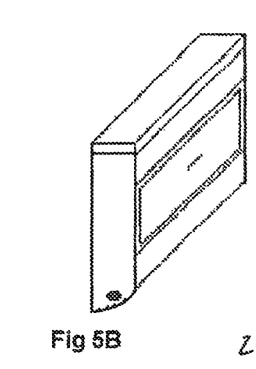
FIG. 5B is a front perspective view of the rear portion of the motorized cart according to the present invention in an upright position with the storage compartment closed.
Figure 5C:
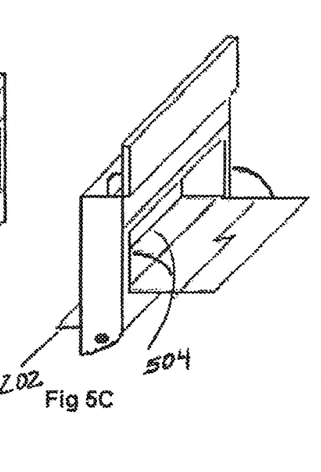
FIG. 5C is rear perspective views of the rear portion of the motorized cart according to the present invention with the storage compartment door in an open position, and a top storage compartment in an open configuration.
Figure 5D:
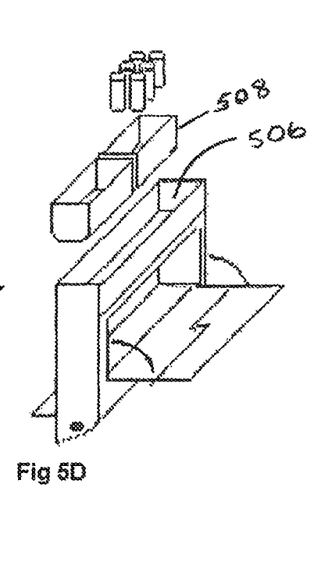
FIG. 5D is a rear perspective view of the rear portion of the motorized cart according to the present invention with the storage compartment door in an open position, and a top storage compartment in an open configuration and showing internal storage trays removed and separate from the compartment.

Turning now to FIG. 5A-5E, there is shown a perspective view of the motorized cart 100 with a detailed view of rear portion 108 showing exemplary compartments which may be included in various embodiments of the present invention. FIG. 5A shows rear portion 108, having a top lid 208, which may be hinged as shown in FIG. 2 or FIG. 5B, a top compartment 206, a front door 502 for closing a compartment 504. FIG. 5B shows the rear portion with the top lid 208 and front door 502 in a closed position. Also, the rear door 202, not seen in this view, is closed. Turning to FIG. 5C, there is shown the rear portion with the top lid 208 and front door 502 in an open position. Also, the rear door 202 is open and can be seen extending horizontally from the back of the rear portion 108. Likewise FIG. 5C shows the rear portion with the top lid 208 and front door 502 in an open position. Also, the rear door 202 is open and can be seen extending horizontally from the back of the rear portion 108. In the embodiment shown in FIG. 5D, there is shown an embodiment where top compartment is open and includes containers 508 for holding items which may include for example drink cans or bottles. In one embodiment, the containers 508 may be insulated container for keeping items cold or hot. In the case of cold items, compartment 506 may be partially filled with ice and containers 508 rested within the ice. Alternately, the compartment 504 may be filled with cold packs for keeping compartments 204, 504 and 506 cold and thus the items therein. Alternately, the insulated containers may hold thermos type containers for keeping the contents hot. The insulated containers 508 may be removable as shown in FIG. 5D. The top lid 208 may also incorporate solar panels 210 covering the top surface for recharging the drive motor batteries, or for providing power to charge portable electronic devices. The solar panels may be electrically connected to the drive motor batteries through a charging circuit in a manner as will be understood by one skilled in the art. Additionally, the solar panels may be connected to separate accessory batteries through a charging circuit for charging the accessory batteries. There may also be electrical connectors for connecting portable electronic devices to the accessory batteries, such that a user can charge a portable electronic device using the accessory batteries, while the solar panel can re-charge the one or more accessory batteries thereby extending the useful life of the accessory battery.

Figure 5E:
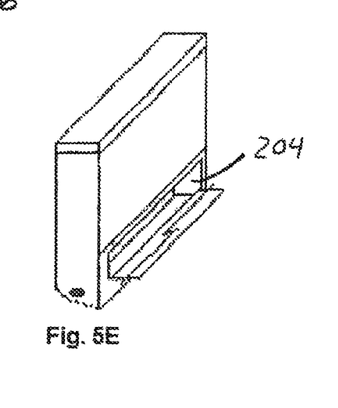
FIG. 5E is a front perspective view of the rear portion of the motorized cart according to the present invention with the storage compartment door in an open position, and a top storage compartment in a closed configuration

Turning to FIG. 5E, there is shown the rear portion 108 from FIGS. 5A-5D from the reverse perspective where in the rear door 202 is visible and in an open position to reveal inner compartment 204. This rear compartment may be used for holding drive components of the motorized cart for example batteries, an electronics control panel for connecting to control device such as a remote control or throttles. Additionally, there may be provided a charging circuit so that a user may be able to recharge both the drive motor batteries and the accessory batteries by connecting the charging circuit to a standard household current outlet.

Figure 6B:
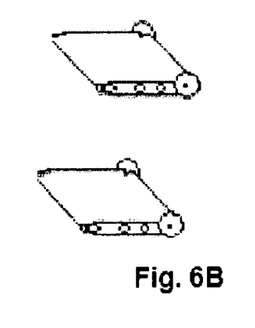
FIG. 6B depicts a left side top perspective view of the drive track system of the motorized cart according to the present invention separated from the cart.
Figure 6C:
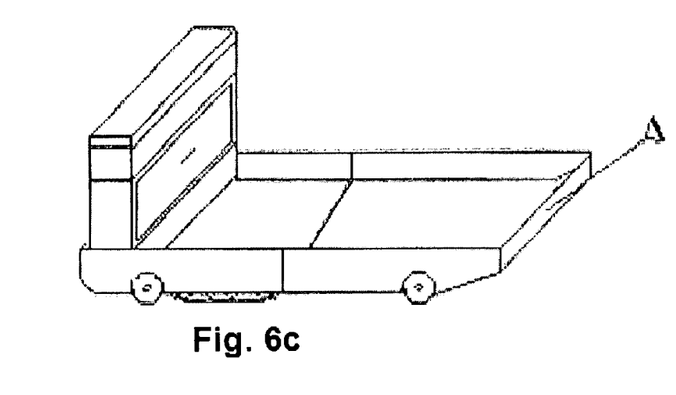
FIG. 6C depicts a side perspective view of the motorized cart according to the present invention with the drive track system attached to the cart.

Turning now to FIGS. 6A and 6B, there is shown a perspective view of the drive track system of the motorized cart according to the present invention. As described above, the drive or propulsion track 110 is typically attached to the bottom of rear portion 108. The drive track 110 is located on the bottom of rear portion, such that it is in contact with the ground when the motorized cart is in the open horizontal position. In that position, when the track 110 is moved by the electric motors, the motorized cart can be pushed along surface of the ground but the force exerted by the track upon the ground surface. To aid in the construction, use and maintenance of the motorized cart according the present invention, the drive track system may be a self contained and modular component such that it can be removed from the motorized cart for maintenance and repair. As shown in FIG. 6A, the track 110 may include a drive track 602 which is motorized as described herein and may include a non drive track 604, which does not have any motor drive, but instead moves freely on rotating wheels or track idler wheels which allow the track to move freely across the ground, while still maintaining uniform and consistent directional stability. The drive track system may be rigidly attached to the bottom of the cart in a manner as would be understood by one skilled in the art.

Also visible in FIGS. 6A and 6B are drive motors 402. In one embodiment, the drive motors 402 may be tubular motors, such as those typically used to power conveyor belt systems. The tubular motors may be installed and rigidly mounted under the motorized cart in such a way to provide power to the track as will be known by one skilled in the art. The drive track 110 may be one such as used on a snow mobile for example with a profile adapted to be used on both loose surfaces such as sand or more firm surfaces such as grass fields, concrete or asphalt. In addition, it is not necessary in accordance with the present invention to use tubular motors, but instead a motor or motors attached to a drive shaft and sprocket system such as those used in snowmobiles may be used to power the track 110. In another alternate embodiment, a motor or motors may be attached to a drive axle to power a wheel or wheels, such as wheels 112 may be utilized to eliminate the need for a drive track.

Turning now to FIG. 7A-7D, there is shown an alternate embodiment of the present invention having features and components adapted to alternate uses such as skiing or snow-boarding. In such an embodiment there may be included racks 702 or attachment clamps 704 or holders 706 for carrying skis and or snowboards as are well known in the art. While the present invention as depicted in FIGS. 7A-7D has a particular number of racks 702, clamps 704 or holders 706, one skilled in the art will recognize that any number racks 702, clamps 704 or holders 706 is possible within the spirit of the invention, Additionally, compartment 204 may be adapted to carry items such as gloves, hats or boots and may include a heating device to warm the items for use. Such a heating device may include an electric incandescent or hot air device, which may be run from the provided electric battery or solar energy power.

In another alternate embodiment, the present invention may be adapted to other cold weather uses and activities such as ice-fishing and thus may include compartments particularly adapted to carrying fishing tackle and racks 702, clamps 704 or holders 706 may be adapted for carrying fishing poles and equipment and compartments, such as storage cabinet 204 or 506 or 504, having containers 508 may be particularly adapted to carrying bait, fish or other ice fishing equipment as is known to one skilled in the art.

As will be apparent to one skilled in the art, the motor drive system and drive track can be connected to a controller circuit for controlling the motor drive output. In other works, the drive track can be controlled to move the motorized cart in a forward or backward direction and be turned by adjusting the power output of the motors in accordance with inputs from the user through a control device. The control device may include buttons, joysticks or other control input devices known in the art for controlling the motor drive system and therefore controlling the movements of the motorized cart.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims and their equivalents. Therefore, the scope of the present invention should not be limited to the above-described embodiments but should be determined by not only the appended claims but also the equivalents thereof, and all differences within the scope will be construed as being included in the present invention.

What is claimed is:

1. A foldable motorized recreation cart, comprising:
at least a first and a second connected section, each of said sections connected with a hinge and pivotable with respect to each other and further including a compartment hingedly connected to either one of said first or said second section, said compartment having a bottom floor, four side walls and a top cover surface, said compartment having an internal space containing, a motor drive system, a drive controller and a battery, wherein the battery and drive controller are electrically connected to the motor drive system and the motor drive system is mechanically linked to at least one of a drive wheel or a drive track mechanism for propelling the foldable motorized recreation cart, where said motor drive system is located within said drive track mechanism, and said drive track mechanism is a self-contained, modular and removable component.

* * * * *